United States Patent

Messick et al.

[11] Patent Number: 6,039,073
[45] Date of Patent: Mar. 21, 2000

[54] CHECK VALVE

[75] Inventors: DeLaun T. Messick; Mark A. Novak, both of West Des Moines, Iowa

[73] Assignee: International Valve Corporation, West Des Moines, Iowa

[21] Appl. No.: 09/260,938

[22] Filed: Mar. 2, 1999

[51] Int. Cl.[7] .................................................. F16K 15/00
[52] U.S. Cl. ........................................ 137/515.7; 137/542
[58] Field of Search ............................... 137/515.7, 515, 137/542, 454.2; 251/148

[56] References Cited

U.S. PATENT DOCUMENTS

| | | |
|---|---|---|
| 953,330 | 3/1910 | Gordon, Jr. . |
| 1,260,663 | 3/1918 | Gould et al. .............................. 137/541 |
| 1,364,001 | 12/1920 | Shadduck ............................. 137/515.7 |
| 2,170,478 | 8/1939 | Long et al. ............................... 137/542 |
| 2,351,874 | 6/1944 | Parker ..................................... 137/542 |
| 2,524,951 | 10/1950 | Ashton . |
| 2,804,281 | 8/1957 | Osburn ................................... 137/543 |
| 2,909,192 | 10/1959 | Dobrick . |
| 2,943,639 | 7/1960 | Smith ..................................... 137/543 |
| 2,973,008 | 2/1961 | Klose ..................................... 137/543 |
| 3,434,495 | 3/1969 | Scarmucci ............................ 137/454.2 |
| 3,749,122 | 7/1973 | Gold .................................... 137/515.7 |
| 3,995,658 | 12/1976 | Hager ..................................... 137/543 |
| 4,148,338 | 4/1979 | Skoli .................................... 137/515.7 |
| 4,279,403 | 7/1981 | Hobson ................................... 251/148 |
| 4,488,556 | 12/1984 | Hicks ................................... 137/515.7 |
| 4,532,958 | 8/1985 | Napolitano ........................... 137/515.7 |
| 4,653,725 | 3/1987 | Nanz et al. .............................. 251/148 |
| 4,765,364 | 8/1988 | Arcari . |
| 4,776,369 | 10/1988 | Lardner et al. . |
| 4,964,391 | 10/1990 | Hoover . |
| 4,998,554 | 3/1991 | Rogers . |
| 5,033,503 | 7/1991 | Horton et al. . |
| 5,113,900 | 5/1992 | Gilbert . |
| 5,617,893 | 4/1997 | Webster . |

*Primary Examiner*—Denise L. Ferensic
*Assistant Examiner*—Joanne Y. Kim
*Attorney, Agent, or Firm*—Zarley, McKee, Thomte, Voorhees & Sease

[57] ABSTRACT

A check valve is positioned in and between opposed tube ends and includes a valve body having a valve seat engageable by a valve element having a stem extending centrally of peripherally spaced apart elements interconnected by an annular end shoulder engaged by a keeper which receives the outer end of the valve stem and holds a coil spring against the valve element. The valve assembly is disassembled by manipulating the keeper against the spring out of engagement with the annular end shoulder.

9 Claims, 2 Drawing Sheets

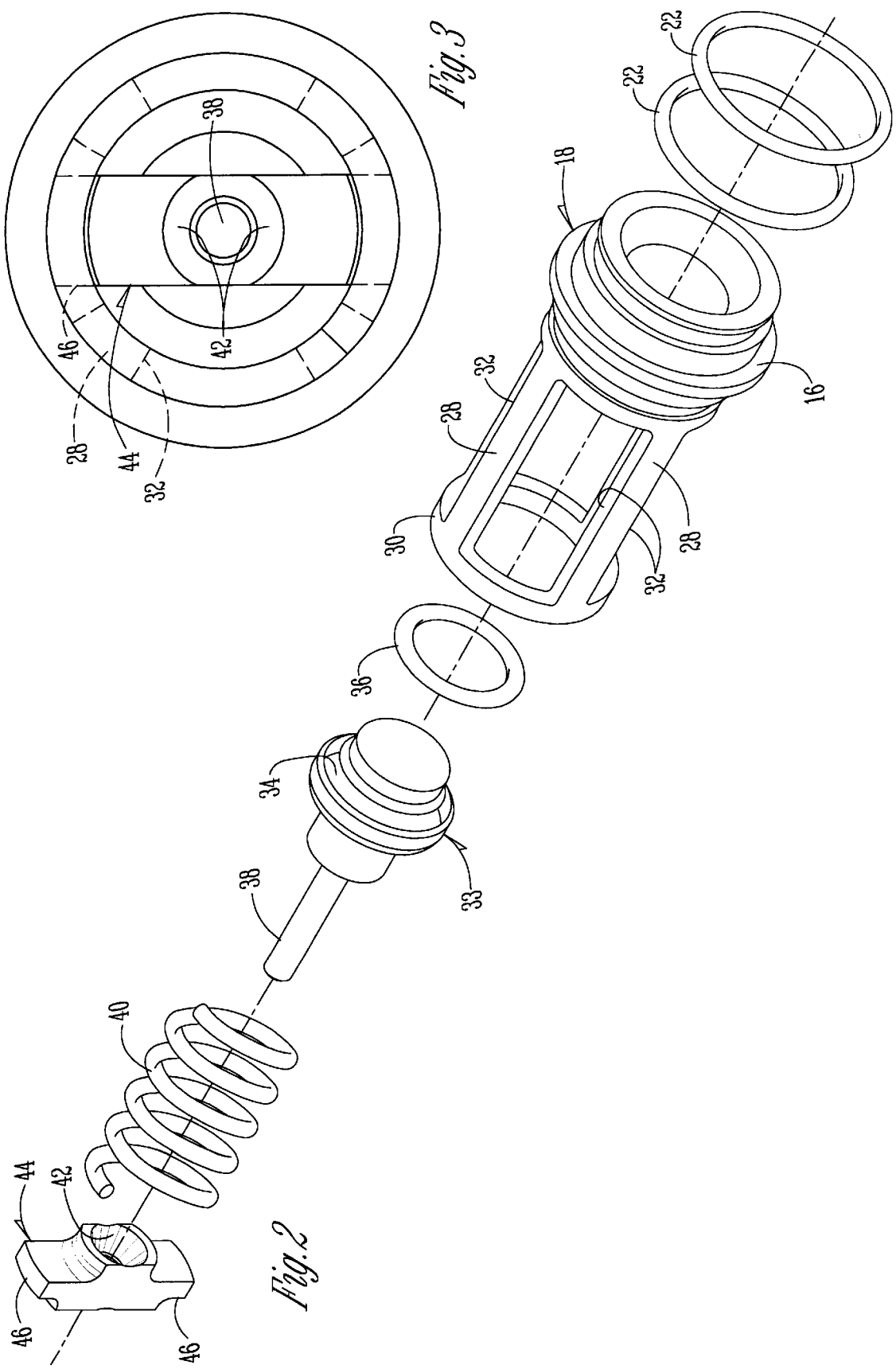

CHECK VALVE

BACKGROUND OF THE INVENTION

The check valve of U.S. Pat. No. 5,033,503 on which I am a co-inventor sold by Check-All Valve, Mfg. Co., Des Moines, Iowa, has been very successful. In food processing, however, modifications to this valve when used in sanitary tubing are needed that will minimize cracks and crevices where microbal and bacterial growth may occur and for ease of cleaning and sterilization.

SUMMARY OF THE INVENTION

The valve is mounted entirely within opposed tube ends which engage an annular shoulder on the valve body to hold the valve stationary.

The valve body includes a valve seat and a plurality of longitudinally extending spaced apart elements interconnected by an annular end shoulder which engages a keeper positioned between the elements and which receives the stem of a valve element. The valve element includes a seat engageable with the valve body seat. A coil spring is positioned on the stem of the valve element and engages the keeper to maintain the valve element in a normally closed position.

The flow of liquid through the valve assembly is maximized by the substantial spacing between the component parts which in turn allows for ease of the assembly and disassembly for cleaning. The keeper is readily accessible from the open end of the annular end shoulder and through the spacing between the longitudinally extending spaced apart elements. The keeper has a passageway through it which receives the outer end of the valve element stem. The passageway increases in cross-sectional area in opposite directions allowing the keeper to be pivoted on the stem for ease of positioning between the elongated spaced apart elements and against the annular end shoulder.

DESCRIPTION OF THE DRAWINGS

FIG. 2 is an exploded view of the valve assembly.

FIG. 3 is an end elevational view taken from the left end of FIG. 1 along lines 3—3.

DESCRIPTION OF THE PREFERRED EMBODIMENT

Figure 1:
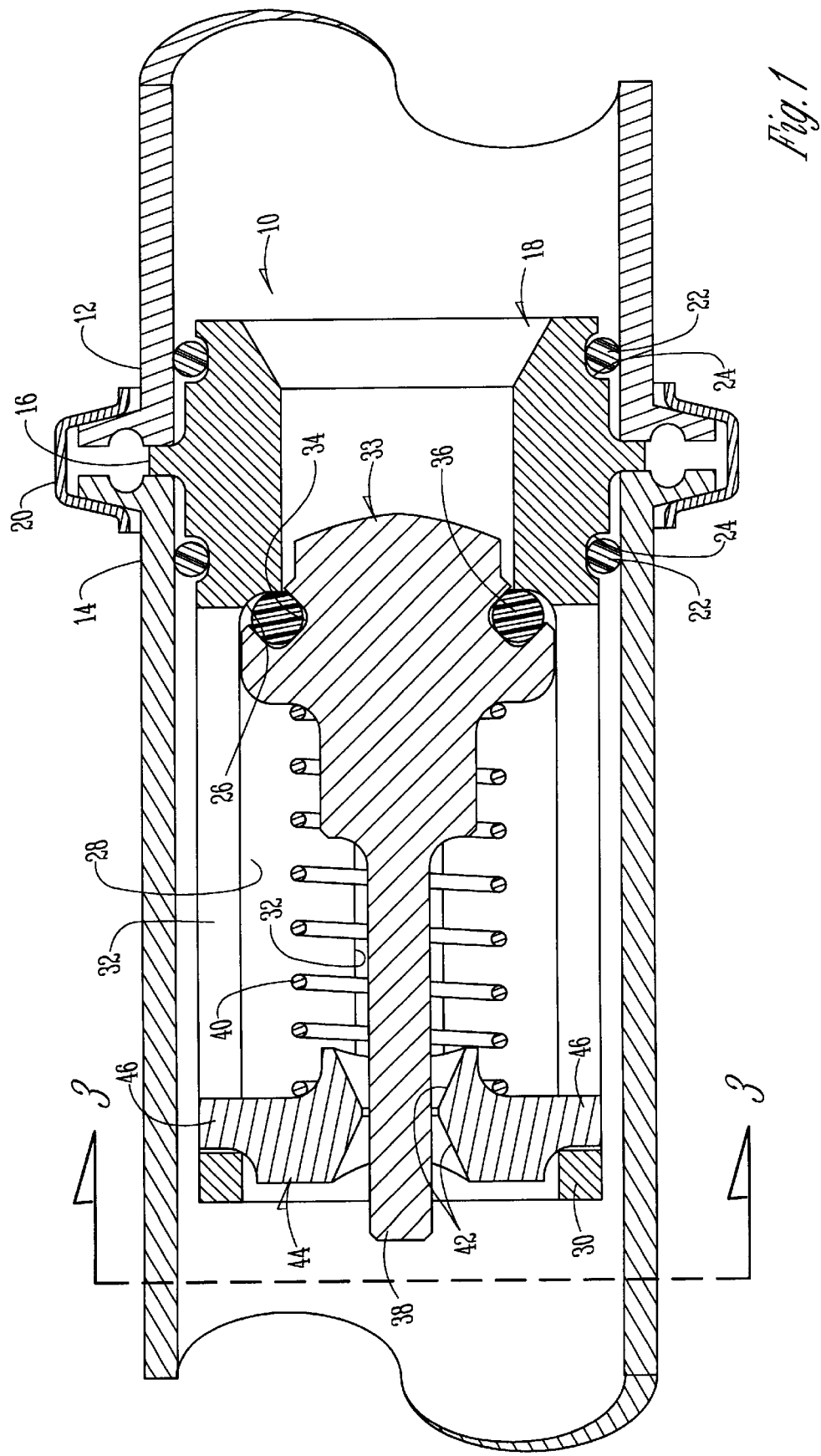
FIG. 1 is fragmentary side elevational view of the check valve positioned in the opposed ends of a pair of tubes.

The valve assembly of this invention is referred to generally in FIG. 1 by the reference numeral 10 and is seen mounted in the opposed tube ends 12 and 14 which engage an annular shoulder 16 on a valve body 18. A clamp 20 locks the tube ends 12 and 14 to the valve body 18.

A pair of O-rings 22 are received in annular recesses 24 on opposite sides of the annular shoulder 16 to provide a seal between the valve body 18 and the inside surfaces of the tube ends 12 and 14. The valve body 18 includes a valve seat 26.

The valve body 18 includes longitudinally extending spaced apart elements 28 which are interconnected at their outer ends by an annular end shoulder 30 providing substantial spacing 32 therebetween. The annular end shoulder 30 provides an open end to the valve body.

A valve element 33 includes a seat 34 which receives an O-ring 36 engageable with the valve body seat 26. A valve stem 38 extends through a coil spring 40 into a keeper passageway 42 which increases in cross-sectional area from the center outwardly in opposite directions to allow manipulation on the stem 38 when being assembled and disassembled. The keeper 44 includes opposite ends 46 which are positioned between the valve body elements 32 against the annular shoulder 30.

It is thus seen that in operation a predetermined fluid pressure against the valve element 33 causes the valve to open allowing free flow of liquid therethrough around the valve element and through the spacing 32 and out the open end through the annular shoulder 30 around the keeper 44. Cleaning of the valve assembly 10 is simplified by the valve design which allows for efficient removal from between the tube ends 12 and 14 upon removal of the clamp 20. The keeper 44 is easily pivoted on the valve stem 38 to allow for its removal through the annular end shoulder 30 thereby allowing the valve element 33 to be removed exposing the interior of the valve body 18 for cleaning.

What is claimed is:

1. A valve assembly comprising,
   a unitary valve body having opposite ends and a valve seat,
   a plurality of peripherally spaced apart longitudinal elements extending from one end of said valve body to an annular shoulder,
   a valve element having a valve seat on one end and a stem on the opposite end, said valve element seat adapted to seat against said valve body seat with said stem extending parallel and centrally of said longitudinal elements and being received in a keeper element having opposite ends engaging said annular shoulder between said longitudinal elements, and
   a spring on said stem between said valve body and said keeper element for normally maintaining said valve element in closed seated engagement with said valve body seat and said keeper element in engagement with said annular shoulder.

2. The valve assembly of claim 1 wherein said valve stem is slidably received in a central opening in said keeper element.

3. The valve assembly of claim 2 wherein said keeper element central opening includes a passageway increasing in cross-sectional area towards said valve element whereby said keeper may be pivoted on said stem for engagement with and disengagement from said annular shoulder.

4. The valve assembly of claim 1 wherein said plurality of spaced apart longitudinal elements function to allow fluid flow therebetween and accessing said keeper for engaging and disengaging said annular shoulder.

5. The valve assembly of claim 1 wherein said spring on said valve element valve stem is a coil spring.

6. The valve assembly of claim 1 wherein said valve body includes an outer annular shoulder with annular sealing elements on opposite sides thereof whereby said outer annular shoulder is adapted to be engaged by opposing ends of a pair of tubes in which said valve assembly is adapted to be received.

7. A valve assembly comprising,
   a valve body having opposite ends and a valve seat,
   a plurality of peripherally spaced apart longitudinal elements extending from one end of said valve body to an annular shoulder,
   a valve element having a valve seat on one end and a stem on the opposite end, said valve element seat adapted to seat against said valve body seat with said stem extending parallel and centrally of said longitudinal elements and being received in a keeper element having opposite ends engaging said annular shoulder, a spring on said stem between said valve body and said keeper element for normally maintaining said valve element in closed seated engagement with said valve body seat, said valve stem is slidably received in a central opening in said keeper element, and said central opening of said keeper element central including a passageway increasing in cross-sectional area towards said valve element whereby said keeper may be pivoted on said stem for engagement with and disengagement from said annular shoulder.

8. The valve assembly of claim 7 wherein said central opening passageway also increases in cross-sectional area away from said valve element.

9. A valve assembly comprising, a valve body having opposite ends and a valve seat, a plurality of peripherally spaced apart longitudinal elements extending from one end of said valve body to an annular shoulder, a valve element having a valve seat on one end and a stem on the opposite end, said valve element seat adapted to seat against said valve body seat with said stem extending parallel and centrally of said longitudinal elements and being received in a keeper element having opposite ends engaging said annular shoulder, a spring on said stem between said valve body and said keeper element for normally maintaining said valve element in closed seated engagement with said valve body seat, and said plurality of spaced apart longitudinal elements function to allow fluid flow therebetween and accessing said keeper for engaging and disengaging said annular shoulder.

* * * * *